UNITED STATES PATENT OFFICE.

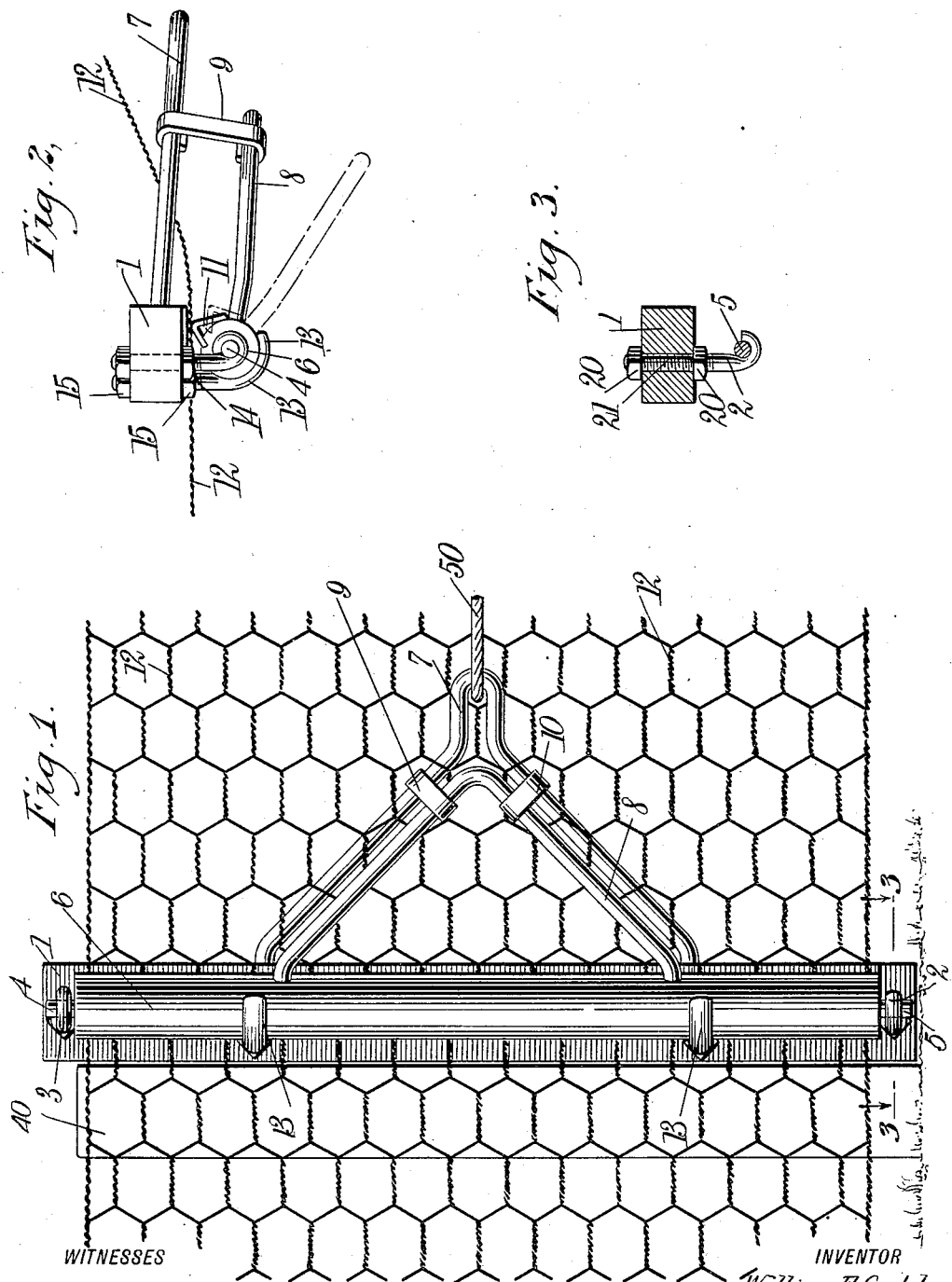

WILLIAM F. GOOLSBY, OF LIVINGSTON, TENNESSEE.

FENCE-WIRE STRETCHER.

1,018,313.  Specification of Letters Patent.  Patented Feb. 20, 1912.

Application filed July 26, 1911. Serial No. 640,664.

*To all whom it may concern:*

Be it known that I, WILLIAM F. GOOLSBY, a citizen of the United States, and a resident of Livingston, in the county of Overton and State of Tennessee, have invented a new and Improved Fence-Wire Stretcher, of which the following is a full, clear, and exact description.

My invention involves a stretcher for use with fence-wire and is particularly directed to an implement which consists of few parts and which may be produced at a low cost, the construction and arrangement of the parts being such that the device is capable of rapid work.

The invention comprises a suitable base member having a pivoted member eccentrically movable thereon, the fence-wire being gripped between the base member and the movable member so that when suitable handles on the device are moved in one direction the fence-wire may be tightened previous to attaching it to the posts.

Reference is to be had to the accompanying drawings, forming a part of this specification, in which similar characters of reference denote corresponding parts in all the views, and in which—

Figure 1 is a side view of my device showing it in operative position; Fig. 2 is a top plan view of the device; Fig. 3 is a sectional view thereof on the line 3—3 of Fig. 1.

A base member 1 of any suitable form of construction, preferably rectangular, is provided adjacent its ends with hooked members 2, 3, the ends of which afford bearings for the pivots 4, 5, carried by the opposite ends of the movable and preferably rotatable member 6. The base member 1 is provided with a laterally extending handle 7 preferably made of an integral piece of wire, the movable member 6 being also provided with a handle 8 somewhat similar to the handle 7, the two handles being held together when the device is in operable position by means of catches 9, 10, engaging each of them. Secured along a line through the length of the movable member 6 is a rib or projecting portion 11 which is movable with the member 6, this rib or projecting portion being adapted to engage the strands 12 of a wire fence by holding them tightly engaged with the base member 1, as shown particularly in Fig. 2 when the stretcher is in use. In order to brace the movable member 6 when in use and prevent it from becoming deranged through excessive strain I have provided braces 13 which are in the nature of hooks having a threaded shank 14 entering the base member 1 and secured between suitable nuts 15 on opposite sides thereof. The movable member 6 which is preferably cylindrical is seated against the hooks so that the intermediate portions of this member are held to their normal position when the device is in use.

In Fig. 3 I have shown the lower hooked member 2 in detail, it being secured to the base member 1 by means of nuts 20, 20, engaging the threaded end 21 of the hook and lying on opposite sides of the base member. The pivotal support 5 for the movable member 6 engages in the over-turned end of the hooked member, the construction of the hook being such that the movable member may be easily withdrawn from engagement with the hooks and the base member 1 by merely turning the handle 8 to inoperative position allowing the member 6 to drop out. The movable member 6 with the rib or projecting portion 11 thereon is in effect an eccentrically movable means which when in one position swings clear of the strands 12 of the fence but which when moved to another position forces these strands closely against the base member 1.

In using my device the catches 9 and 10 are removed and the handles are moved apart to the position shown in dotted lines in Fig. 2 when the member 6 may be taken out of position; the base member 1 is then brought adjacent any suitable post 40 and the wire fence is laid against one side of the base member and the movable member is then placed in position on the tightener and the handles 7, 8, are brought together and held in such position by means of the hooks; by then pulling to the right on the hooks, or, as shown in the drawings, on the lower one only, by any suitable means such as a rope or chain 50, the fence-wire may be drawn tight and when in such position the staples or other attaching means may be brought into engagement with the fence post, thereby holding the wire secured thereon.

Having thus described my invention, I claim as new, and desire to secure by Letters Patent:—

1. A device of the class described comprising a base member, an eccentrically pivoted member thereon, the said member being movable to one position in order to permit the fence-wire to be inserted between the said members, movement of the said eccentric member to another position causing the said wire to be tightly engaged between the said members, together with braces engaging the pivoted member to prevent it from bending during movement.

2. A device of the class described comprising a base member, an eccentrically pivoted member supported thereon, hooks in which the said member turns, the said member being adapted to be brought into engagement with fence-wire in order to force the same tightly against the base member whereby the fence-wire may be stretched, there being suitable means carried by the base member and engaging the pivoted member whereby bending of the pivoted member during movement is prevented.

3. A device of the class described comprising a base member, a cylindrical member pivotally supported thereon, a rib or projecting portion on the said cylindrical member, the said member being movable into one position in order to carry the said rib away from the base member and movable into another position in order to bring it adjacent thereto whereby fence-wire may be tightly engaged between the base member and the said rib, there being suitable means carried by the base member and engaging the pivoted member whereby bending of the pivoted member during movement is prevented.

4. A device of the class described comprising a base member, hooks thereon, a cylindrical member having a projecting portion extending from end to end rotatably mounted in the said hooks, a plurality of braces secured to the base member and engaging the cylindrical member to prevent it from bending, the said movable member in one position bringing the rib away from the base member and when in another position bringing it adjacent thereto, whereby fence-wire may be tightly gripped between the said members and stretched.

5. A device of the class described comprising a base member, a handle extending laterally thereof, hooks adjacent opposite ends of the said member, a cylindrical member rotatably mounted in the hooks, a handle extending laterally of the said cylindrical member, a projecting portion on the side of the said cylindrical member and extending throughout its length, together with means for holding the handles closely together with the said projecting portion adjacent the base member whereby when fence-wire is engaged between the said member and the projecting portion it may be stretched by pulling on the said handles, there being braces in engagement with the pivoted member to prevent it from bending during turning.

6. A device of the class described comprising a base member and a member pivoted eccentrically thereto, a portion of the eccentrically pivoted member in one position lying closely adjacent the base member and in another position being remote therefrom, the said members being adapted to securely hold a wire strand between them, there being suitable means engaging the pivoted member intermediate of its ends whereby bending thereof during turning is prevented.

In testimony whereof I have signed my name to this specification in the presence of two subscribing witnesses.

WILLIAM F. GOOLSBY.

Witnesses:
C. J. CULLOM,
G. L. MATTHEWS.

---

Copies of this patent may be obtained for five cents each, by addressing the "Commissioner of Patents, Washington, D. C."